United States Patent
Van Den Broek

[11] Patent Number: 5,825,667
[45] Date of Patent: Oct. 20, 1998

[54] PARACHUTE RELEASE DEVICE

[75] Inventor: Eric Van Den Broek, Sterrebeek, Belgium

[73] Assignee: Airtech GmbH, Wunnenberg, Germany

[21] Appl. No.: 784,773

[22] Filed: Jan. 16, 1997

[30] Foreign Application Priority Data

Jan. 17, 1996 [EP] European Pat. Off. .............. 96870002

[51] Int. Cl.⁶ ...................................................... G01B 7/00
[52] U.S. Cl. .......................... 364/562; 364/565; 364/566; 244/149; 244/150; 702/166; 702/142
[58] Field of Search .................................... 364/562, 565, 364/566; 244/149, 150, 152, 147

[56] References Cited

U.S. PATENT DOCUMENTS

| | | | |
|---|---|---|---|
| 4,527,758 | 7/1985 | Ayoub et al. | 244/150 |
| 4,792,903 | 12/1988 | Peck et al. | |
| 4,858,856 | 8/1989 | Cloth | 244/149 |
| 5,222,695 | 6/1993 | Lake | 244/122 AE |
| 5,362,016 | 11/1994 | Aronne | 244/152 |

FOREIGN PATENT DOCUMENTS

| | | |
|---|---|---|
| 281159 | 9/1988 | European Pat. Off. . |
| 480733 | 4/1992 | European Pat. Off. . |

*Primary Examiner*—James P. Trammell
*Attorney, Agent, or Firm*—Dorsey & Whitney LLP

[57] ABSTRACT

The present invention relates to a parachute release device comprising a data processing and acceleration determining means connected to said data processing system and provided for determining an acceleration parameter indicating the acceleration of a falling object to which the parachute is attached, said data processing system being provided for calculating from said acceleration parameter and a jump duration time an instant speed and an instant height value, and for generating a release signal for opening said parachute when said instant height value reaches an opening height value.

14 Claims, 2 Drawing Sheets

PARACHUTE RELEASE DEVICE

RELATED APPLICATIONS

This application claims the priority of European Patent Application No. 96870002.1, filed Jan. 17, 1996, which is incorporated herein by reference.

BACKGROUND OF THE INVENTION

The present invention relates to a parachute release device provided to be mounted on a parachute, which parachute is provided to be attached to an object, said device comprising:

- a data processing system having a release signal output and a memory provided for storing an opening height value, indicating the height at which the parachute should be opened, said data processing system being provided for generating a release signal for opening said parachute;
- height determining means connected to said data processing system and provided for determining an initial height value indicating the height at which a jump is started; and
- time determination means provided for counting the jump duration time as from the start of the jump.

Such a device is known from EP-B-0 281 159. According to this known device, a pressure sensor is used as height determining means. This sensor is used for determining the initial height value and for determining further pressure values which are compared with theoretical values. These theoretical values are however not very accurate, since the speed of a falling object depends from a number of parameters, such as for example the weight of the object attached on the parachute or the air resistance of the object (in case the object is a person, this air resistance may vary as to which kind of clothes the person wears). Moreover, such a pressure sensor is influenced by the behaviour of the object. In case the object is a person performing acrobatic movements, the pressure reading will vary as to which position is taken by the person.

SUMMARY OF THE INVENTION

The object of the invention is to provide a parachute release device which is provided for more accurately determining at which moment the parachute should be released.

According to the invention, the device further comprises acceleration determining means connected to said data processing system and provided for determining an acceleration parameter indicating the acceleration of the falling object to which the parachute is attached, said data processing system being provided for calculating from said acceleration parameter and said jump duration time an instant speed and an instant height value, and for generating said release signal when said instant height value reaches said opening height value.

Since acceleration determining means are less sensitive to dynamic behaviour than a pressure sensor, a more accurate measurement is performed. From the measurement, an accurate height value can be calculated using mathematical formulae. Moreover, when the object performs movements, it does not disturb the operation of the acceleration determining means.

According to a first preferred embodiment of the device according to the invention, said data processing system comprises means for generating a peak value signal when said acceleration parameter exceeds a predetermined threshold value, indicating that the parachute has been opened, said data processing system being further provided to overrule said release signal under control of said peak value signal. This peak value signal enables to neutralise said release signal when said parachute has already been opened.

According to a second preferred embodiment of the device according to the invention, said memory is further provided for storing a threshold falling speed, indicating the speed the object should not exceed with an open parachute, said data processing system is provided for generating said release signal for releasing an auxiliary parachute after having generated said peak value signal when said calculated speed exceeds said threshold falling speed. This allows to open an auxiliary parachute when the falling object exceeds a predetermined speed. In the case the object is a person, this predetermined speed will depend from the experience of the person.

According to a third preferred embodiment of the device according to the invention, said height determining means comprise a pressure sensor provided for determining a ground pressure and further pressure measurements, and said data processing system comprises comparison means provided for comparing said further pressure measurements with said ground pressure to determine a height value. This allows to determine said initial height by comparing the ground pressure with the pressure measured at the height at which the jump is started.

According to a fourth preferred embodiment of the device according to the invention, said determined ground pressure is adjustable. This allows to adjust the ground pressure value when the ground level is different at the place where the object left the ground than at the place where the jump is started.

According to a fifth preferred embodiment of the device according to the invention, said pressure sensor is further provided for determining a further instant height value, independent from the instant height value calculated from the acceleration parameter, said data processing system comprises means for comparing said further instant height value with said calculated instant height value, and said data processing system comprises further means provided for correcting the speed on the basis of said comparison. Preferably, said means for correcting is provided for correcting said speed on the basis of a substitution of said calculated instant height value by the average value between said calculated instant height value and said further instant height value. This allows to check and correct the height calculated from the acceleration parameter.

Other details and advantages of the invention will become apparent from the following description of a parachute release device according to the invention. The reference numerals relate to the figures annexed hereto.

DETAILED DESCRIPTION OF THE PREFERRED EMBODIMENTS

Figure 1:
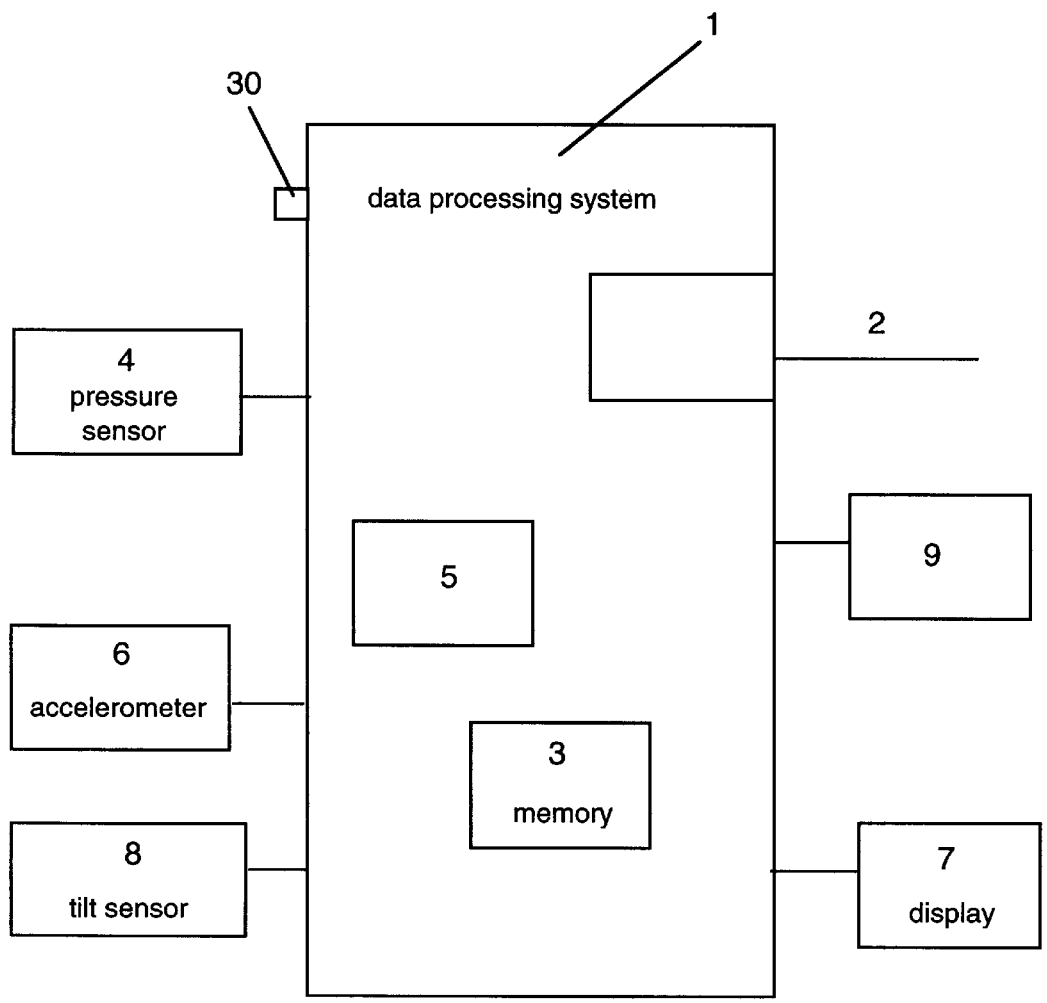
FIG. 1 shows schematically a device according to the invention.

The device according to the invention comprises a data processing system 1, for example a microprocessor, having a release signal output 2 and a memory 3. The memory 3 is provided for storing at least an opening height value, indicating the height at which the parachute should be opened.

The data processing system 1 is provided for generating a release signal at the release signal output 2 for opening a parachute (not shown), onto which the device is mounted.

The device comprises further switching means 30 provided to switch the device in stand-by position. Preferably, a security equipment is provided for switching the device in stand-by position when said switching means have been switched a predetermined number of times, for example four times, within a predetermined time limit, for example within 10 seconds. This security equipment is provided to avoid that the device is switched in stand-by position accidentally during the jump.

A pressure sensor 4, for example an absolute pressure sensor (absolute vacuum is reference) measuring pressures from 0 to 1034 mbar (0 to 15 PSI), is connected via an analog-digital converter to the data processing system 1. The pressure sensor is provided for measuring pressure values. From the measured pressure values, height values can be determined since the height is proportional to the pressure. Time determining means 5, for example formed by a counter as a part of the microprocessor, are provided for counting the jump duration time as from the start of the jump. Finally, acceleration determining means 6 having a digital output, for example an accelerometer of the type 5 g provided to measure accelerations from 0 to 5 g or from 0 to 49 m/s$^2$, are connected to the data processing system 1 and provided for determining an acceleration parameter indicating the acceleration of a falling object to which the parachute is attached. In a preferred embodiment, a tiltsensor 8, for example of the mercury switch type, is connected to said data processing system 1 and provided for determining if the direction of the acceleration is within the switching angle of the tiltsensor. In this way, the device detects if the object attached to the parachute falls with an open parachute and with an acceleration.

The data processing system 1 is further provided for calculating from the acceleration parameter and the jump duration time an instant speed and an instant height value, and for generating the release signal when said instant height value reaches said opening height value. This can be performed by integration of the acceleration parameter values. An example of such a calculation will follow later.

Additionally, a display 7 is connected to said data processing system, provided for displaying messages and values. A human interface 9, for example a keyboard, is connected to said data processing system 1 and provided for inputting data into the system.

Preferably, the data processing system is loaded with fuzzy logic programming. The advantage of fuzzy logic programming is that more parameters than the speed and the altitude are taken into account to output a release signal. More details about fuzzy logic programming will be explained in the description of FIG. 2.

Figure 2:
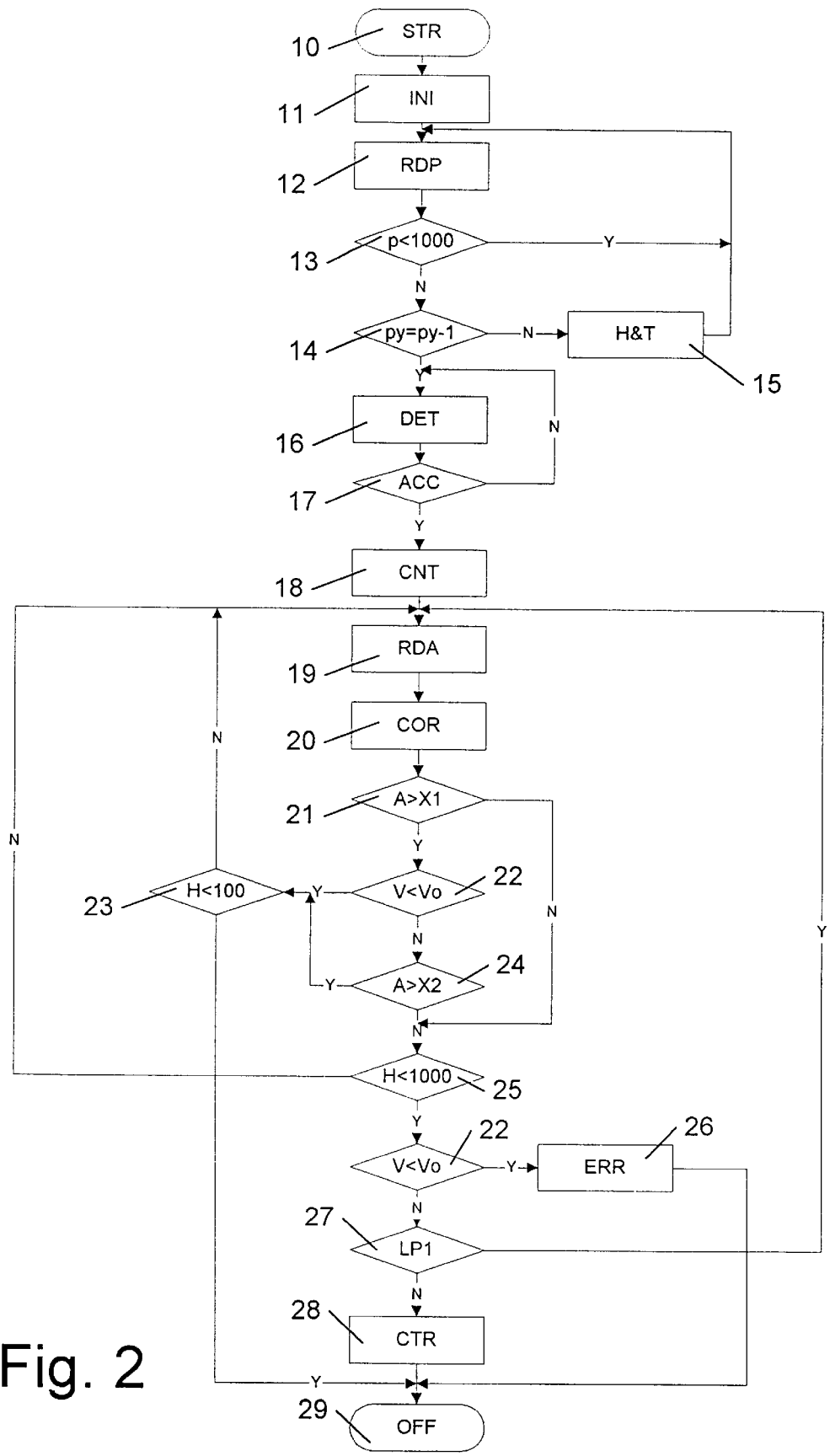
FIG. 2 is a flowchart illustrating the operating procedure of the device according to the invention.

FIG. 2 illustrates by means of a flow chart the operation of the device according to the invention. The different steps are performed under control of the data processing system. The different steps of the operating procedure will now be explained. In the following operating procedure, there is started with the following example where a parachute jumper starts his jump from an aeroplane.

10. STR

The procedure routine is started by switching on the switching means of the device. This routine is started at ground level before leaving the ground. When switching on the device, the presence of any disturbances is checked and the normal status of signals of the components of the device is checked in a known manner. If any anomaly is detected, an error message appears on the display 7.

11. INI

The pressure sensor measures the ground pressure and stores it in the memory. Preferably, this ground pressure can be adjusted, which is necessary if the ground level at the place where the object leaves the ground is different from the ground level at the place where the jump is started. This adjustment can be performed by inputting the height difference between the ground level at the place where the object leaves the ground and the ground level at the place where the jump is started. According to an alternative, the ground pressure at the place where the parachute should land is input manually. Fixed values, such as the threshold speed, can also be adjusted in this step by inputting a value by means of the human interface. Further in this step, all the flags indicating a status are reset. If fuzzy logic is used, flags can be used to indicate a probability of danger. For example "UP" indicates that the jumper is going up by aeroplane, "FALLING" indicates that the jumper is started and the jumper is accelerating, "FREE FALL" indicates that the jumper is falling down at a speed higher than 30 m/s, "DANGER 1" indicates that the jumper performs continuous acrobatic movements passing an altitude of 900 m (3000 ft), "DANGER 2" indicates that the jumper performs continuous acrobatic movements passing an altitude of 450 m (1500 ft), "RED ALERT" indicates that the jumper performs continuous acrobatic movements passing an altitude of 390 m (1300 ft) and "DANGER 3" indicates that the main parachute is open but that the speed is too high. It will be explained later how these flags are set.

12. RDP

The actual pressure is measured with the pressure sensor. If the measured pressure is different from the ground pressure the flag "UP" is set, thus indicating that the jumper is probably in the aeroplane and going up.

13. p<1000?

In this step, there is checked if the difference of the (adjusted) ground pressure with the measured pressure is lower than a value corresponding to a height of approximately 300 m (1000 ft). In case the jump is started at a height lower than 300 m, use of the device has no sense since the parachute has to be opened immediately.

14. $p_y = p_{y-1}$?

There is checked if the pressure reading is the same as the previous pressure reading. Subsequent pressures are measured periodically, for example each 15 seconds.

15. H&T

The measured pressure is compared in the data processing system with the ground pressure or adjusted ground pressure to determine an initial height value. This can be achieved since the height is proportional to the pressure. From this initial height, a theoretical time before the parachute should be opened is determined. Said initial height and said time are stored in the memory.

16. DET

An acceleration parameter is read from the acceleration determining means.

17. ACC?

There is checked if the acceleration parameter corresponds to an acceleration value of approximately 5 m/s$^2$. In this way, the device detects when the jump is started and the flag "FALLING" is set.

18. CNT

When the jump is started, the time determination means starts to count the jump duration.

19. RDA

An acceleration parameter is read from the acceleration determining means. If fuzzy logic is used, this acceleration parameter is compared with the previously read acceleration parameters. If the polarity of these parameters is continuously different, this means that the jumper performs continuous acrobatic movements. Depending on the determined height, the flags "DANGER 1", "DANGER 2" and "RED ALERT" can be set. If "RED ALERT" is set, this means that there is a serious danger and therefore, the routine jumps directly to step 27. In this way, the release signal is output at a height 90 m (300 ft) higher than the critical height of 300 m (1000 ft), which gives some more time for the auxiliary parachute to be opened in case there is a delayed parachute opening caused by the acrobatic movements.

20. COR

From the acceleration parameter, the jump duration from the start of the jump and the initial height, a fall speed and an instant height value are calculated by integration of the acceleration parameter. A pressure is measured with the pressure sensor and a further instant height value is determined from the measured pressure. This further instant height value is compared with said calculated height value. A correction is performed based on for example the average value between said height values. From this corrected height value, a corrected speed is calculated. The corrected values are stored in the memory. If the speed is higher than 30 m/s the flag "FREE FALL" is set.

21. A>X1?

There is checked if the acceleration parameter has exceeded a predetermined threshold value X1, which is stored in the memory. Under normal circumstances, the acceleration parameter should not exceed about 5 m/s$^2$. When the parachute is opened, this creates a shock and therefor an instant acceleration parameter, which is much higher than 10 m/s$^2$. 10 m/s$^2$ can therefor for example be taken as threshold value X1. When this threshold value is exceeded, this means that the parachute has been opened. This routine is for example performed by checking the status of the parachute open flag. This flag is initially reset. When the parachute is open, the flag is set.

22. V<V$_0$?

There is checked if the corrected speed is lower than a predetermined a threshold falling speed, which is stored in the memory. This predetermined threshold falling speed is a safe speed at which a jumper should fall with an open parachute. This value depends from the experience of the jumper, and is usually situated between 5 and 25 m/sec. If the corrected speed is higher than said predetermined treshold falling speed with an open parachute, then the flag "DANGER 3" is set.

23. H<100 ?

There is checked if the corrected instant height value is lower than 30 m (100 ft).

24. A>X2?

There is checked if the auxiliary parachute has been opened. This can be performed in the same way as for the main parachute. An auxiliary parachute flag is therefor set to 1 when the auxiliary parachute is open.

25. H<1000?

There is checked if the corrected instant height value is lower than 300 m (1000 ft). If fuzzy logic is used, the device checks the status of flags by masks (i.e. a combination of bit settings, each bit corresponding to a flag), which masks describe a certain possible falling condition and possible dangerous situations.

26. ERR

The system has failed and an error message appears on the display, because it is not possible that the falling speed at free fall is lower than the predetermined threshold speed.

27. LP1?

There is checked if the accelerometer parameter has been read only 1 time since H<1000. This is to avoid that a release signal is output on the basis of 1 measurement in the critical area, i.e. the area below 300 m (1000 ft).

28. CTR

A release signal is output from the data processing system to release the auxiliary parachute. Preferably this release signal consists in a pulse train with a predetermined frequency. This signal is input in a selective bandfilter, which let pass only signals with the predetermined frequency. This is to avoid that disturbances activate the output.

29. OFF

The device is switched off.

An example of the calculation of the speed and the height will now be described. The actual speed can be found from the equation:

$$V_i = V_{i-1} + a_i \cdot \Delta t$$

wherein $V_i$ is the speed at moment i, $V_{i-1}$ is the previously speed (corrected), $a_i$ is the acceleration value at moment i, and $\Delta t$ is the time duration between moment i and i−1.

The distance from the start of the jump can be found from the equation:

$$S_i = \int_0^i V_i \cdot dt$$

wherein $S_i$ is the distance to be measured.

A free-fall of a skydiver starts for example a fall with an acceleration of 4.9 m/s$^2$. Each second, an acceleration value is measured. This is however only an illustration. Normally an acceleration value is measured every 1/10 second. In this example, it is assumed that the skydiver accelerates during a period of 10 seconds, which is necessary to obtain a speed of 49 m/s, and after 10 seconds the acceleration value is 0 m/s$^2$ and the speed remains at a level of 49 m/s.

The following values will be found:

| i | $a_i$(m/s$^2$) | $V_i$(m/s) | $S_i$(m) |
|---|---|---|---|
| 1 | 4.9 | 4.9 | 4.9 |
| 2 | 4.9 | 9.8 | 14.7 |
| 3 | 4.9 | 14.7 | 29.4 |
| 4 | 4.9 | 19.6 | 49 |
| 5 | 4.9 | 24.5 | 73.5 |
| 6 | 4.9 | 29.4 | 102.9 |
| 7 | 4.9 | 34.3 | 137.2 |
| 8 | 4.9 | 39.2 | 176.4 |
| 9 | 4.9 | 44.1 | 220.5 |
| 10 | 4.9 | 49 | 269.5 |
| 11 | 0 | 49 | 318.5 |
| 12 | 0 | 49 | 367.5 |
| 13 | 0 | 49 | 416.5 |

The actual altitude can be found by subtraction of the start altitude minus the total distance on a certain time. When the actual altitude is corrected by means of the value measured by the pressure sensor as explained hereinabove, a correction is made on the distance. For example, if the start altitude is 2500 m and the total distance after 13 seconds is 416.5, then the actual distance will be 2083.5 m. If from the pressure reading an actual height is determined which is 2091.5 m and the correction is based on the average value between those two values, the corrected height will be 2087.5 m. The corrected total distance will then be 412.5 m.

According to an alternative of the described embodiment, the initial height, indicating the height at which the jump is started is input manually in the memory by means of the human interface, the initial height value being determined by interrogating the height determining means of the aeroplane just before starting the jump.

In the described embodiment, use is made of fuzzy logic programming. According to an alternative, the data processing system is not loaded with fuzzy logic programming and the device does not use flags indicating the probability of danger to output a release signal, but it only uses the calculated speed and height.

According to the described embodiment, the release signal is used for opening an auxiliary parachute. According to an alternative, the release signal can also be used to open the main parachute.

The device according to the invention can also be used to dissociate a parachute from its attached object when the ground is reached. This can be useful for cargo release systems to prevent that the cargo is town away by the parachute once it is on the ground. In this case, the data processing system comprises a dissociation output, provided for generating a dissociation signal for dissociating the parachute from the cargo when the instant height value is the ground level.

Moreover, the device according to the invention can also be used as a mechanism for releasing the parachute of an ejector seat in an aeroplane. In this case, the data processing system is provided for generating the release signal when a reverse in the speed direction is determined.

According to another embodiment the critical values are different from the values of the described embodiment (300 m (1000 ft) and 30 m (100 ft)).

I claim:

1. A parachute release device provided to be mounted on a parachute, which parachute is provided to be attached to an object, said device comprising:
   a data processing system having a release signal output and a memory provided for storing an opening height value, indicating a height at which said parachute should be opened, said data processing system being provided for generating a release signal for opening said parachute;
   height determining means connected to said data processing system and provided for determining an initial height value indicating a further height at which a jump is started; and
   time determination means provided for counting a jump duration time as from a start of said jump;
   characterised in that said device further comprises acceleration determining means connected to said data processing system and provided for determining an acceleration parameter indicating an acceleration of said object to which said parachute is attached, said data processing system being provided for calculating from said acceleration parameter and said jump duration time an instant speed and an instant height value, and for generating said release signal when said instant height value reaches said opening height value.

2. Device according to claim 1, characterised in that said data processing system comprises means for generating a peak value signal when said acceleration parameter exceeds a predetermined threshold value, indicating that said parachute has been opened, said data processing system being further provided to overrule said release signal under control of said peak value signal.

3. Device according to claim 2, characterised in that said memory is further provided for storing a threshold falling speed, indicating a speed said object should not exceed with an open parachute, said data processing system is provided for generating said release signal for releasing an auxiliary parachute after having generated said peak value signal when said calculated instant speed exceeds said threshold falling speed.

4. Device according to claim 3, characterised in that said data processing system comprises further means for generating a second peak value signal when said acceleration parameter exceeds a second predetermined threshold value, indicating that said auxiliary parachute has been opened, said data processing system being further provided to overrule said release signal under control of said second peak value signal.

5. Device according to claim 1, characterised in that said height determining means comprise a pressure sensor provided for determining a ground pressure and further pressure measurements, and said data processing system comprises comparison means provided for comparing said further pressure measurements with said ground pressure to determine a height value.

6. Device according to claim 1, characterised in that said height determining means comprise a pressure sensor provided for determining a ground pressure and further pressure measurements, and said data processing system comprises comparison means provided for comparing said further pressure measurements with said ground pressure to determine a height value and that said determined ground pressure is adjustable.

7. Device according to claim 1, characterised in that:
   said height determining means comprise a pressure sensor provided for determining a ground pressure and further pressure measurements,
   said data processing system comprises comparison means provided for comparing said further pressure measurements with said ground pressure to determine a height value,
   said pressure sensor is further provided for determining a further instant height value, independent from said instant height value calculated from said acceleration parameter,
   said data processing system comprises means for comparing said further instant height value with said calculated instant height value, and
   said data processing system comprises further means provided for correcting said instant speed on the basis of said comparison.

8. Device according to claim 1, characterised in that:
   said height determining means comprise a pressure sensor provided for determining a ground pressure and further pressure measurements,
   said data processing system comprises comparison means provided for comparing said further pressure measurements with said ground pressure to determine a height value,
   said determined ground pressure is adjustable,
   said pressure sensor is further provided for determining a further instant height value, independent from said instant height value calculated from said acceleration parameter,
   said data processing system comprises means for comparing said further instant height value with said calculated instant height value, and
   said data processing system comprises further means provided for correcting said instant speed on the basis of comparison.

9. Device according to claim 1, characterised in that said height determining means comprise a pressure sensor provided for determining a ground pressure and further pressure measurements, said data processing system comprises comparison means provided for comparing said further pressure measurements with said ground pressure to determine a height value, said determined ground pressure is adjustable, said pressure sensor is further provided for determining a further instant height value, independent from said instant height value calculated from said acceleration parameter, said data processing system comprises means for comparing said further instant height value with said calculated instant height value, and said data processing system comprises further means provided for correcting said instant speed on the basis of said comparison whereby said means for correcting is provided for correcting said instant speed on the basis of a substitution of said calculated instant height value by an average value between said calculated instant height value and said further instant height value.

10. Device according to claim 1, characterised in that said data processing system comprises means for neutralising said release device when said initial height value is lower than said opening height value.

11. Device according to claim 1, characterised in that it comprises means for neutralising said device when said instant height value reaches a predetermined height value.

12. Device according to claim 1, characterised in that said data processing system comprises a dissociation output, provided for generating a dissociation signal for dissociating said parachute from its attached object when said instant height value is a ground level.

13. Device according to claim 1, characterised in that said data processing system is provided for generating said release signal when a reverse in a speed direction is determined.

14. Device according to claim 1, characterised in that it comprises means provided for switching said device in stand-by position when said means have been switched a predetermined number of times within a predetermined time limit.

* * * * *